United States Patent [19]
Plotkin et al.

[11] Patent Number: 5,297,124
[45] Date of Patent: Mar. 22, 1994

[54] TAPE DRIVE EMULATION SYSTEM FOR A DISK DRIVE

[75] Inventors: Barry Plotkin, Stony Brook; Daniel C. Ginsburg, North Massapaqua, both of N.Y.

[73] Assignee: Miltope Corporation, Melville, N.Y.

[21] Appl. No.: 874,585

[22] Filed: Apr. 24, 1992

[51] Int. Cl.⁵ .................... G11B 7/013; G06F 13/00
[52] U.S. Cl. ...................... 369/32; 360/48; 395/500
[58] Field of Search ............ 369/32; 360/15, 72.2, 360/32, 48; 395/500; 364/927.81

[56] References Cited

U.S. PATENT DOCUMENTS

| | | | |
|---|---|---|---|
| 4,727,512 | 2/1988 | Birkner | 364/DIG. 2 |
| 4,775,969 | 10/1988 | Osterlund | 369/53 |
| 5,034,914 | 7/1991 | Osterlund | 369/32 X |

OTHER PUBLICATIONS

Mitchell, Jr., "Diskette Load/Dump Control" IBM Technical Disclosure Bulletin, vol. 20, No. 4, Sep. 1977.

*Primary Examiner*—Tony M. Argenbright
*Attorney, Agent, or Firm*—Whitham & Marhoefer

[57] ABSTRACT

The invention relates to an emulator system which allows a disk drive to transparently emulate a tape drive. The system converts sequential format tape records into block format disk records and visa-versa. Identification and conversion information for each of the data records are stored in directory located on the outermost sectors of the disk. Within each directory are a plurality of entries each containing four fields: TAPE RECORD NUMBER (TRN); DISK START ADDRESS (DSA); WORD COUNT (WC); and FLAG. These fields contain all of the necessary information required to map a tape formatted data record to a disk and thereafter retrieve the data record from the disk and convert it back to tape format.

12 Claims, 3 Drawing Sheets

TAPE DRIVE EMULATION SYSTEM FOR A DISK DRIVE

DESCRIPTION

Background of the Invention

1. Field of the Invention

The present invention generally relates to a tape drive emulator, and more particularly, to a mapping scheme which allows a magnetic or magneto-optical disk drive to transparently emulate a tape drive.

2. Description of the Prior Art

The magnetic tape drive, once a common computer peripheral, has been widely replaced by magnetic or magneto-optical disk drives as the primary mass storage means for computer systems. These technologies offer many advantages over magnetic tape technology, the most significant of which include ease of data access and retrieval speed. However, many computer systems still in use rely on magnetic tape and magnetic tape drive technology to store and retrieve files and application programs. Such computer systems do not have a controller or interface to control information or receive information from a disk drive. Extensive hardware and software modifications would be necessary to existing systems using magnetic tape as a storage medium in order to enable them to use commercially available disk technology as a storage medium.

An alternative approach to modifying the computer system to accommodate a disk drive is to have the replacement disk drive transparently emulate a tape drive in a "plug-compatible" fashion. In this case, no hardware modifications to the computer system are required. To be completely transparent, an emulator must be used which is able to accept the entire set of tape drive commands, such as space forward, reverse, erase, etc. from the host computer and translate them to commands that can be executed by the disk system in a manner that emulates a tape system. The emulator must also be able to send the host computer expected tape-drive interrupt signals such as beginning-of-tape (BOT), end-of-tape (EOT), and inter-record-gap (IRG).

Due to the radically different formats between tape and disk drives, one-to-one data mapping is not possible. A disk may store thereon many files, each of which contain a plurality of data records. Disks are commonly divided into fixed length "sectors" or blocks, which are normally only 512 or 1024 bytes in length. Data can only be written to, or read from a disk in blocks. When writing or updating data to a disk, the image of the block is stored or created in a buffer, such as a RAM, and written as a block of data to the disk. It is not possible to perform operations on individual bytes of data, but rather, operations must be performed on entire blocks of data.

On the other hand, a reel or cartridge of magnetic tape often stores only one file. Within that file there are many records, of random length, sequentially recorded along the length of the tape. Each record, of course, is composed of individual data bytes which are stored on the tape. Different tape systems may use different formats to store the data. Conventionally, data bytes are either recorded across the tape on a single data track one after the other or are recorded serially on one of several data tracks which run parallel along the length of the tape. The records are usually sequentially numbered and are separated by inter-record gaps.

U.S. Pat. No. 4,775,969 to Osterlund shows a system write once read many (WORM) optical disk system and mapping scheme which emulates a tape system. Osterlund is not a truly transparent emulation, since the mapping scheme from tape to WORM optical disk does not allow for the erasable and rewritable nature of magnetic tape.

M. J. Mitchell, Jr., Diskette Load/Dump Control IBM Technical Disclosure Bulletin, Vol. 20, No. 4, September, 1977 shows a control interface unit which allows a diskette drive to be driven by magnetic tape support in a transparent fashion. The mapping scheme disclosed by Mitchell, Jr. is a crude load/dump function used for data streaming operations which are performed infrequently. The system cannot emulate classical tape function such as erasing or reuse.

SUMMARY OF THE INVENTION

It is an object of the present invention to provide a plug-compatible emulator system which allows a disk drive, having an erasable and rewritable disk medium, to be driven by a computer system using tape drive commands communicated through a tape drive interface. The disk may be either a magnetic disk or a rewritable optical disk.

Briefly, the invention contemplates an emulation system connected between a host computer's tape interface and a disk drive device to convert sequential format tape records into block format disk records and visa-versa. Identification and conversion information for each data record is stored in a directory located on the outermost sectors of the disk. The directory is comprised of individual entries each of which correspond to a particular data record. Within each directory entry are four fields TAPE RECORD NUMBER (TRN); DISK START ADDRESS (DSA); WORD COUNT (WC); and FLAG. These fields contain all of the necessary information required to map a tape formatted data record to a disk and thereafter retrieve the data record from the disk and convert it back to tape format.

The directory is located on the outer most sectors of the disk away from the actual data records. The TRN field of a particular directory entry identifies a particular data record by a number indicative of where the data record would appear sequentially on a tape. The DSA field identifies the disk address at which the first byte of the data record can be found on the disk. The WC field stores the length of the data record in bytes and, the FLAG field identifies the status of the record i.e. initial (not before used), valid or erased.

A redundant directory, which is a mirror image of the main directory is also provided for back-up in the event of a main directory error.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
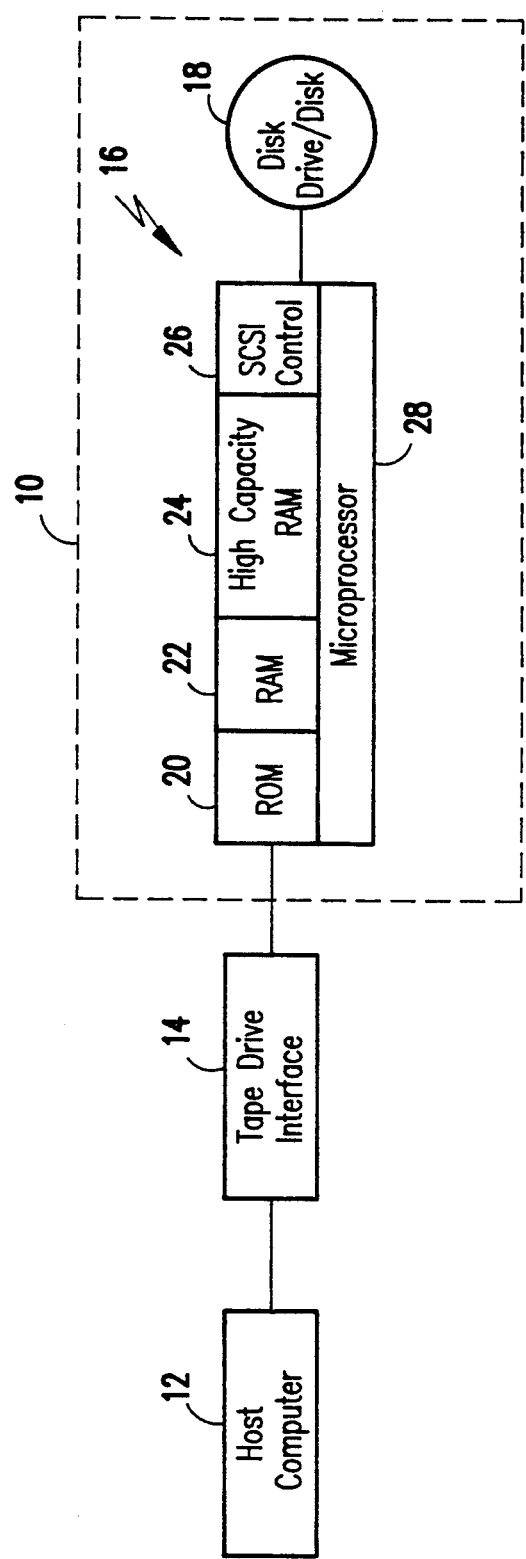
FIG. 1 is a block diagram of the present invention.

Referring now to the drawings, and more particularly to FIG. 1, there is shown a block diagram of the present invention generally referred to by the reference numeral 10. A host computer 12 is connected to a tape interface unit 14 to provide a data and control interface for a typical tape drive system (not shown). An emulator 16 is connected between the tape interface 14 and either a magnetic or rewritable optical disk drive 18. The emulator 14 is comprised of a suitable microprocessor 28, which could be for example, a Motorola 68010, a ROM 20 (for example, ATMEL 27C26), for containing microprocessor instructions, a RAM 22 (for example, Cypress Semiconductor 6116) for temporarily storing microprocessor program variables and directory information, a high capacity RAM 24 (for example IDT 8MP824S) for temporarily storing record data, and an SCSI (small computer system interface) controller 26, which could be for example, an NCR or Logic Devices Incorporated 5380. The SCSI controller 26 uses a block oriented protocol for expressing the variable sized "tape" data as fixed size blocks of data, required by the disk drive 18.

The emulator 16 is plug compatible with the tape interface 14 and serves to translate data formats and control signals between the disk drive 18 and the tape interface 14.

In an off-line mode, the emulator 16 initializes the disk 18 by laying down a master directory on the outermost sectors. The master directory is made up of a plurality of entries. A redundant directory is also created as a precautionary back-up in the event of a read or write error occurring in the master directory. When accessing the disk 18, the main directory is always read first, if a read error occurs, the redundant directory is then used. The redundant directory is updated with the main directory so that an accurate back-up is always available. Of course the disk initialization is performed in an off-line mode since the host computer 12 has no way to initiate such an operation.

Figure 2:
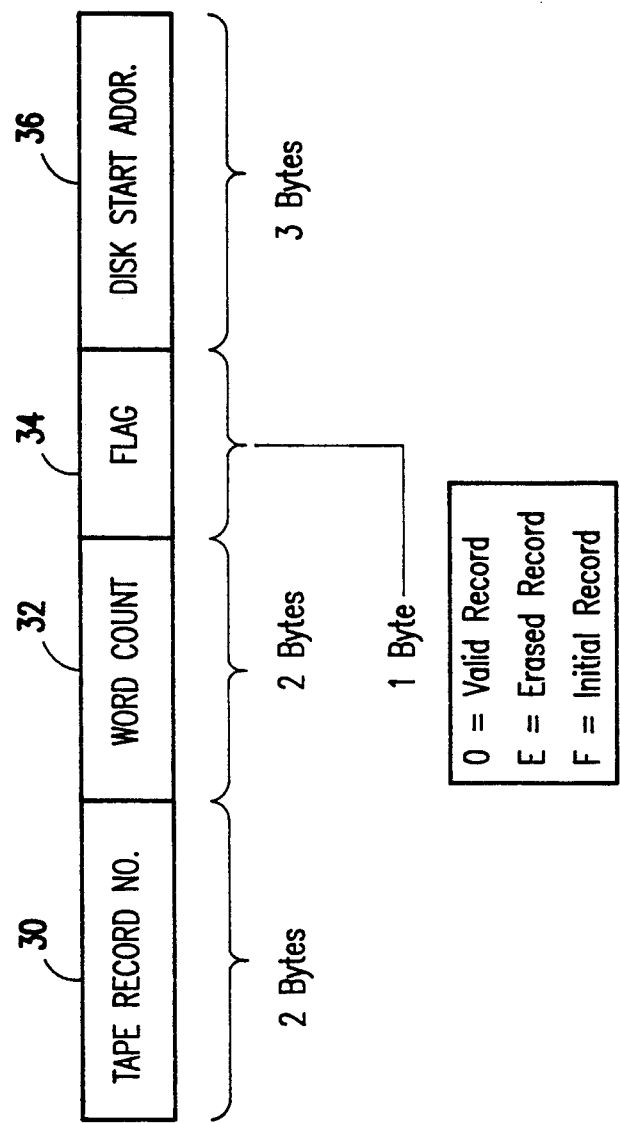
FIG. 2 is a block diagram of the parameter fields within each disk directory entry.

FIG. 2 shows four fields contained within each directory entry. The fields are TAPE RECORD NUMBER (TRN) 30, WORD COUNT (WC) 32, FLAG 34, and DISK START ADDRESS (DSA) 36. In the preferred embodiment, TRN 30 is two bytes, WC 32 is two bytes, FLAG 34 is one byte, and DSA 36 is three bytes. The TRN 30, DSA 36 and WC 34 fields can be larger or smaller depending on such factors as disk size, number of bytes in a particular data record and total number of data records to be stored on the disk 18. The specific function of each field will be explained below in more detail.

Figure 3:
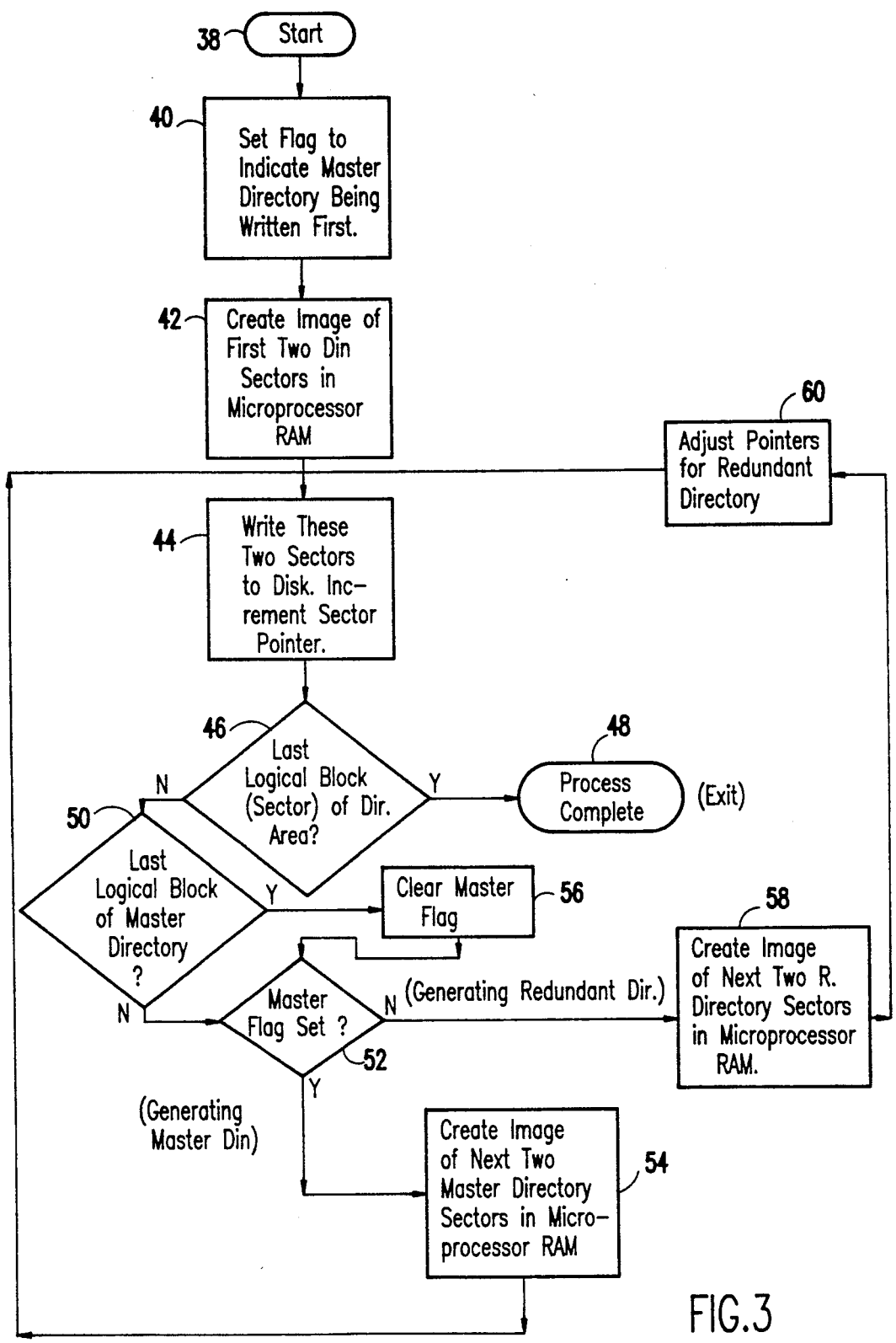
FIG. 3 is a flow diagram illustrating a possible off-line directory generation utility.

FIG. 3 is a flow diagram illustrating a possible way to initialize the master and redundant directories to the disk 18. In the preferred embodiment, each directory entry is eight bytes long, a block of data contains 512 bytes and the RAM 22 has 2048 byte capacity. Therefore, two blocks, each containing 128 directories may be created and subsequently written to the disk 18 at the same time. The additional capacity of the RAM 22 is used by the microprocessor 28 for storage of program control variables.

Starting at block 38 of FIG. 3, a flag is set to indicate the master directory is being written first (block 40). The images of the first two master directory sectors are created by the microprocessor 28 in RAM 22 (block 42). These two sectors are written to the first two disk sectors and sector pointers are incremented to point to the next two disk sectors (block 44). At block 46, it is determined if the last logical block of the area allocated for the directories on the disk has been reached, if so, the directory initialization process is complete (block 48), if not, it is determined at block 50 if the last logical block of the master director has been reached. If the last block of the master directory has not been reached, then the master directory flag will remain set (block 52) and the next two blocks of the master directory will be created in the RAM 22 (block 54) and the cycle is repeated (block 44). If the last logical block of the master directory has been reached (block 50), then the master directory flag is reset (block 56) and the generation of the master directory is completed (block 52). Starting at block 58, the first two blocks of the redundant directory are created in RAM 22. Redundant directory pointers are adjusted (block 60) and the blocks are written to the disk 18 (block 44). This process is repeated until it is determined that the last logical block of the directory area has been reached (block 46) and that the disk directory initialization process is complete (block 48). The main and redundant directories are written to the outermost sectors of the disk, the inner sectors are reserved for data records.

Initially, the TRN 30 fields are sequentially numbered, the DSA 36 and WC 32 fields are set to zero. There are three possible states for the FLAG field 34; INITIAL RECORD (F (HEX)), ERASED RECORD (E (HEX)), or VALID RECORD (0 (HEX)). Initially FLAG is set to F (HEX) for INITIAL RECORD, indicating that data has never been recorded for that directory.

A tape drive physically moves tape sequentially across read/write heads in response to host computer 12 commands to position the tape to a particular record. In contrast, the present invention quickly scans directory entries electronically and sends signals to the host computer 12 emulating typical tape drive signals such as EOT, BOT, and IRG. Each directory entry corresponds to a data record stored elsewhere on the disk.

Generally, the host computer 12 when it is first initialized, issues a rewind command so that the tape drive heads are positioned to read the start of the first data record. Thereafter, as the tape is advanced (forward or reverse), the host computer 12 counts the number of inter-record-gaps (IRG) and adds or subtracts from the count, depending on the direction of the tape motion, in order to correctly determine the current position of the tape heads in relation to the tape.

As above, when the present system is initialized, the host computer 12 assumes that the "tape" head is positioned to read data record number one. To emulate this condition, for all commands other than a stop command, the first block of main directories is read into RAM 22 and the microprocessor 28 looks at the first directory entry. As mentioned above, in the event of a read error, the first block of redundant directories will be read into RAM 22 instead.

For example, a typical "space-forward" command instructs a tape drive to sequentially go to the next IRG, e.g. the next record. Likewise, the microprocessor 28 will look at the next directory entry stored in RAM 22 and issue an IRG signal to the host computer 12. This process will continue with the emulator 16 reading additional directory sectors into RAM 22 until a stop command is issued or until the last directory entry is read and the emulator 16 sends an END OF TAPE (EOT) signal to the host computer 12.

When writing records to disk 18, starting with directory entry number one, data is downloaded from the host computer 12 through the tape drive interface 14, to the emulator 16 wherein the microprocessor 28 and the SCSI controller 26 cooperate to format the data into blocks. The write data is buffered in the RAM 24 and recorded to the disk 18 starting at the address in the DSA field 36 of the directory entry currently being considered by the microprocessor 28. In the case of directory entry number one, this address may be address zero. The number of data bytes are counted and placed in the WC field 32. FLAG 34 is set to 0 (HEX) to indicate that the current directory entry corresponds to a valid data record. The number of blocks occupied by the data is added to the contents of the DSA field 36 and placed in the DSA field 36 of the next directory entry. This provides a disk starting address for data which will be cataloged in the next directory entry.

When reading a data record from the disk 18, the emulator 16 will progress through the directory entries in RAM 22, sending IRG interrupt signals to the host computer 12 after each directory entry is read. If FLAG 34 at the current entry is set to either E (HEX) (erased) or F (HEX) (initial), the record is not read. If FLAG 34 is set to 0 (HEX) (valid), then the emulator 16 commands the disk drive 18 to read starting at the address stored DSA 36. The WC 32 is used to determine the number of data blocks to be read, and the number of actual bytes from those data blocks which are to be sent to the host 12. The data blocks are buffered by the RAM 24. Bytes of data are sequentially sent to the host computer 12 via the tape drive interface 14 just as they would be if a tape drive had actually been used.

To erase a particular record, the FLAG field 34 in the corresponding directory entry is simply set to E (HEX) (erased). Since FLAG 34 is always checked before reading the disk 18, an erased record will never be read.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A tape drive emulation system, for allowing a disk drive device, connected to a host computer through a tape drive interface, to transparently emulate a tape drive device, comprising:
   first recording means for recording a master directory containing a plurality of sequentially numbered entries to an area on a disk, each of said sequentially numbered entries corresponding to a sequentially numbered tape data record, each of said entries containing a DISK START ADDRESS field;
   converting means for converting said tape data record to a disk format data record; and
   second recording means for recording said disk format data record to said disk starting at an address specified by said DISK START ADDRESS field of said corresponding entry.

2. A tape drive emulation system for a disk drive device as recited in claim 1 wherein said entries further include a FLAG field, said FLAG field for indicating the current status of said corresponding disk data record.

3. A tape drive emulation system for a disk drive device as recited in claim 1 wherein said entries further include a WORD COUNT field for storing the length of said corresponding data record.

4. A tape drive emulation system for a disk drive device as recited in claim 1 wherein said first recording means additionally records a redundant directory identical to said master directory.

5. A tape drive emulation system for a disk drive device as recited in claim 1 wherein said disk is a magnetic disk.

6. A tape drive emulation system for a disk drive device as recited in claim 1 wherein said disk is a rewritable optical disk.

7. A tape drive emulation system as recited in claim 1 wherein said system is plug-compatible with said tape drive interface.

8. A method for mapping tape format data records to a disk, comprising the steps of:
   recording a master directory to said disk, said master directory comprised of a plurality of sequentially numbered entries, each of said entries corresponding a sequentially numbered tape data record;
   storing a disk start address for each of said tape data records in said corresponding entry;
   converting said tape data records to disk format data records;
   writing said disk format data records to said disk at said disk start address stored in said corresponding entry; and
   setting a flag within said corresponding entry to indicate a valid data record.

9. A method for mapping tape format data records to a disk as recited in claim 8, further comprising the steps of:
   sequentially traversing said entries on said disk in response to a tape read command;
   sending an inter-record gap interrupt signal to a tape drive interface after each of said entries is traversed;
   checking said flag within each of said entries to determine if said corresponding data record is valid;
   reading said data record from said disk beginning at said start address stored in said entry; and
   converting said data record from disk format data to tape format data.

10. A method for mapping tape format data records to a disk drive as recited in claim 8, further comprising the step of setting said flag to indicate erased condition in response to an erase command.

11. A method for mapping tape format data records to a disk drive as recited in claim 8, further comprising the step of recording a redundant directory to said disk, said redundant directory being identical to said master directory.

12. A method for mapping tape format data records to a disk drive as recited in claim 8 wherein said tape data records are variable in length.

* * * * *

UNITED STATES PATENT AND TRADEMARK OFFICE
CERTIFICATE OF CORRECTION

PATENT NO.: 5,297,124
DATED: March 22, 1994
INVENTORS: Barry Plotkin, Daniel C. Ginsburg It is certified that error appears in the above-identified patent and that said Letters Patent is hereby corrected as shown below.

In column 1, line 4 beneath the title insert the following:
--This invention was made with Government support under N00019-89-C-0101 awarded by the Department of the Navy. The Government has certain rights in this invention.--.

Signed and Sealed this

Seventh Day of April, 1998

*Attest:*

BRUCE LEHMAN

*Attesting Officer*   *Commissioner of Patents and Trademarks*